E. W. MILHADO.
VEGETABLE PEELER OR SCRAPER.
APPLICATION FILED OCT. 2, 1907.

902,428.

Patented Oct. 27, 1908.

UNITED STATES PATENT OFFICE.

EDWARD W. MILHADO, OF MINERAL, VIRGINIA.

VEGETABLE PEELER OR SCRAPER.

No. 902,428.  Specification of Letters Patent.  Patented Oct. 27, 1908.

Application filed October 2, 1907. Serial No. 395,633.

*To all whom it may concern:*

Be it known that I, EDWARD W. MILHADO, a citizen of the United States, residing at Mineral, in the county of Louisa and State of Virginia, have invented certain new and useful Improvements in Vegetable Peelers or Scrapers, of which the following is a specification.

This invention relates to improvements in vegetable peelers or scrapers, and the object is to provide a simple device by means of which the peel may be readily removed from the potato or other vegetable, the device being simple in construction and capable of rapid, convenient operation.

Figure 1:
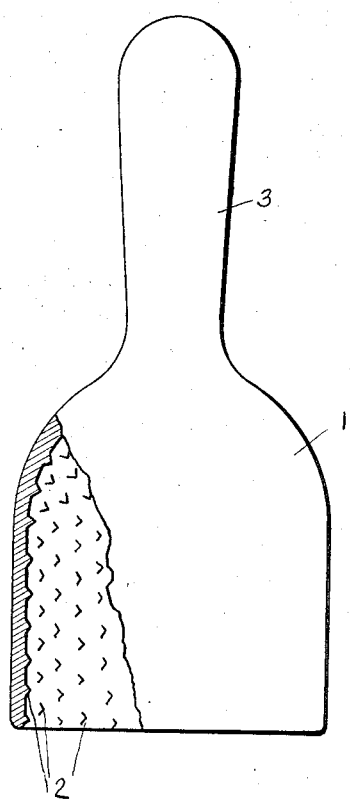
Figure 2:
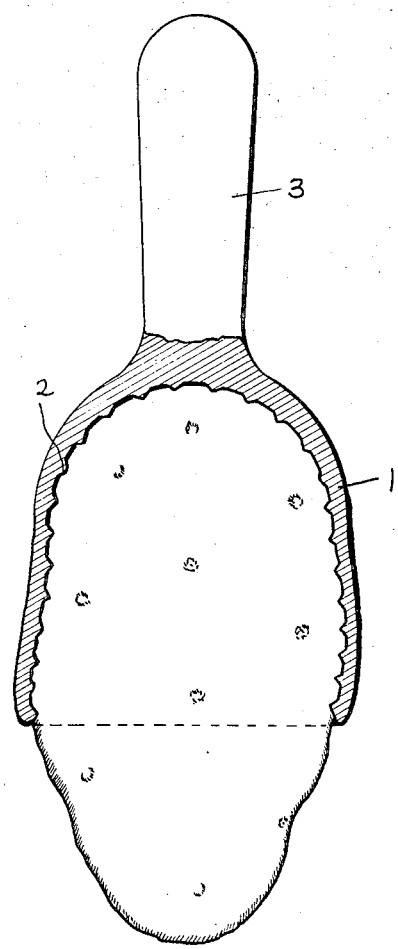

With the above object in view, the invention consists in the novel features of construction hereinafter fully described, particularly pointed out in the claims, and clearly illustrated by the accompanying drawings, in which Figure 1 is a side elevation, partly in section, of a peeling or scraping device constructed in accordance with my invention, and Fig. 2, a sectional view, showing the device applied to a potato.

My improved peeler or scraper consists of a cup-shaped body-portion 1 to receive a substantial portion of the potato or other article to be operated upon, said cup-shaped portion being formed of rubber of sufficient elasticity to accommodate itself to potatoes of different sizes, and to adapt itself to the exterior of the particular potato inserted therein. The cup-shaped portion carries upon its inner surface a plurality of scraping or peeling projections 2, which may be formed of hard substances such as metal embedded in the rubber. Instead of forming these projections separately, the rubber might be molded to form roughened portions. Formed integral with the cup-shaped portion of the peeler, or separately for attachment thereto, is a suitable handle 3.

In operation, the potato or other article is inserted in the cup-shaped portion and a twisting movement imparted, the handle of the device being held in one hand while the projecting portion of the potato is grasped by the other hand of the user. The elastic cup-shaped portion will adapt itself to the contour of the potato, and there will be sufficient friction between the two to effectively remove the skin when the twisting motion is imparted. After a portion of the peeling or skin of the vegetable is removed, the latter is withdrawn from the peeler and its other end inserted, for the purpose of removing the peel or skin of that portion.

While the device can be formed of such size as to accommodate itself to a wide range of potatoes or other articles, yet it may be desirable to manufacture the peeler in several sizes.

From the above description, it will be seen that I have produced a very simple device for removing the peel or skin of potatoes or other vegetables, the device being strong and durable in its construction, and yet so simple that it may be manufactured and sold at a very low price. By the use of this device, the peel or skin may be removed by a very few turns, with a loss of a very small amount of the edible portion of the potato itself.

Having thus fully described my invention, what I claim as new, and desire to secure by Letters Patent of the United States, is:—

1. A device of the character described comprising a body portion to receive the article to be peeled, formed of elastic material and adapted to conform itself to the shape of the article inserted, and carrying upon its interior a plurality of scraping members.

2. A device of the character described, comprising a handle portion, a body portion formed of elastic material adapted to conform itself to the shape of the article inserted and to tightly grip the latter, and a plurality of peel-removing projections carried by the interior of said body portion.

3. A device of the character described, comprising a cup-shaped body-portion formed of rubber and having upon its interior a plurality of peel-removing projections.

In testimony whereof I affix my signature, in presence of two witnesses.

EDWARD W. MILHADO.

Witnesses:
R. F. BURNHAN,
A. P. CARNAHAN.